Patented June 28, 1927.

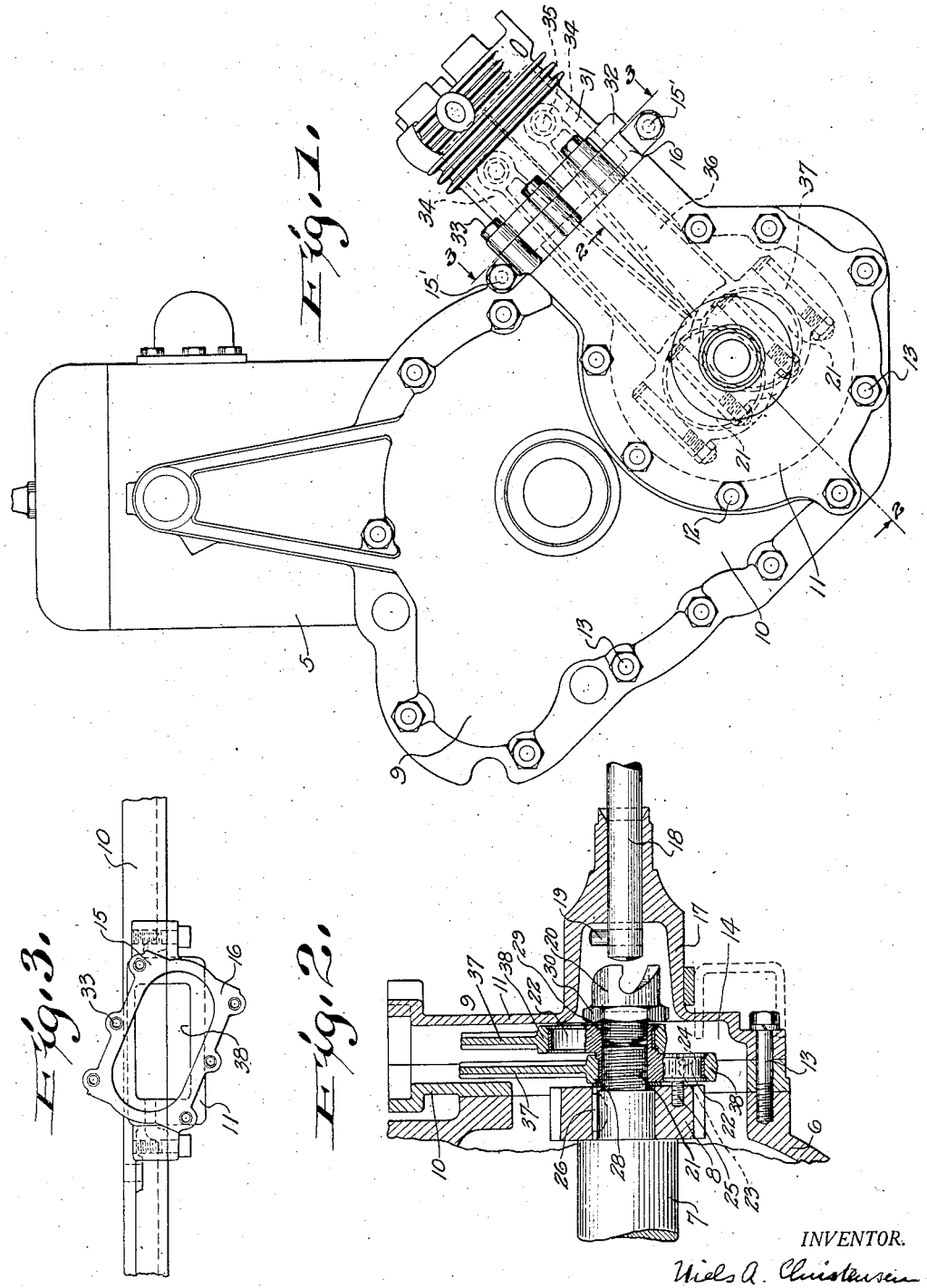

1,633,769

UNITED STATES PATENT OFFICE.

NIELS A. CHRISTENSEN, OF CLEVELAND, OHIO.

MULTICYLINDER AUTOMOTIVE COMPRESSOR.

Application filed April 29, 1926. Serial No. 105,452.

The invention relates to compressors, and more particularly to compressors for automotive vehicles.

Heretofore the drive for the compressor has been from the cam shaft or other auxiliary shaft of the engine and such drives have not been found suitable in practice. The object of this invention is to provide a construction in which the compressor is driven direct from the forward end of the crank shaft and to so arrange the moving parts as to prevent vibration of the forward end of said crank shaft.

A further object of the invention is to associate a two-cylinder compressor with the engine of an automotive vehicle, whereby the front cover plate is constructed to form the crank case of the compressor and a support for the cylinders, and to cant the cylinders relative to the crank case so that the eccentrics and connecting rods may be arranged immediately adjacent each other in a very small space so that the compressor mounting does not interfere with other parts associated with the front end of the engine. Thus, by canting the compressor cylinder relative to its base I am able to use a two-cylinder compressor in which the only increase in length is equal to the relatively narrow width of one of the eccentrics, whereas, if the compressor were arranged in the usual manner the overall length between cylinder centers would make it impractical to provide such a compressor within the space limits usually available for the installation of compressor equipment.

The invention further consists in the several features hereinafter set forth and more particularly defined by claim at the conclusion hereof.

In the drawings Fig. 1 is a front elevation view of an automotive engine equipped with apparatus embodying the invention;

Fig. 2 is a detail sectional view taken along the line 2—2 of Fig. 1;

Fig. 3 is a detail sectional view along the line 3—3 of Fig. 1.

In the drawings the numeral 5 designates an internal combustion engine of the automotive type having a crank case 6 and a crank shaft 7 journalled therein, and 8 one of the timing gears mounted on said shaft beyond a main bearing for the front end of said shaft.

The numeral 9 designates the front cover plate generally which is here shown as formed of separable sections 10 and 11 secured together by bolts 12, the back section 10 being secured to the front end of the engine crank case by bolts 13, some of which also secure the sections 10 and 11 together. These sections 10 and 11 separate the cover section medially and form a crank case 14, and a cylinder mounting pad is formed by parts 15 and 16 on the sections 10 and 11, respectively, which are preferably secured together by bolts 15'.

The front section 11 of the cover plate has a trunnion bearing portion 17 in which the manually operable shaft 18 of the starter crank is journalled, said shaft 18 being provided with a transversely disposed pin 19 and engageable with a starter claw 20 secured within a threaded bore 21 in the eccentrics 22 against the threaded end of the crank shaft.

The integrally connected eccentrics 22, whose eccentricities are 180° apart, have a threaded bore extending therethrough engaging with the threaded end 21 of said shaft 7 and held against rotational displacement in any suitable manner, as by a screw stud or pin 23 extending through a bore 24 in one of said eccentrics and having its threaded end 25 mounted in a threaded hole in the timing gear 8 which has a keyed connection 26 with the shaft 7. A washer 28 is interposed between the inner eccentric and said gear. The starter claw has a threaded portion 29 that screws into bore 21 and against the threaded extension of the crank shaft and a collar portion 30.

The compressor cylinders 31, preferably cast in block, have a flanged base portion 32 secured by bolts 33 to the pad portion of the end plate formed by the parts 15 and 16, and is provided with parallel bores in which compressor pistons 34 work. Each of the pistons is operatively connected to its driving eccentric by a wristpin 35 and a connecting-rod 36 whose adjustable big end bearing 37 is mounted on the eccentric. As each eccentric, connecting-rod, wristpin and piston for one unit of the compressor is of the same weight and dimensions as that of the other unit, and the pistons work in opposite directions, the moving parts are dynamically balanced and hence the crank shaft is relieved of vibrations that might be occasioned by unbalanced forces acting upon it.

The inlet and exhaust valves for the cylinders of the compressor are of known construction and hence not specifically shown here, and the cylinders are preferably formed as a unit casting. It will also be observed that the pad portion and the base of the compressor cylinder are canted relative to the vertical axis of the crank shaft, and this canting is effected in such a way that while the connecting-rods 36 are free to move up and down through an opening 38 in the end plate, they are only spaced apart at their big ends by a working clearance so that the overall length of the crank case is only increased by the width of the relatively narrow eccentric over a single cylinder compressor arrangement. Thus an extremely compact compressor construction is provided which permits a two-cylinder compressor to be used in the space available in the usual automotive engine installations of motor vehicles.

Removal of the cylinders 31 by removal of the bolts 33 permits an inspection of the piston rings and wristpins of the compressor, and removal of the front section 11 of the cover plate upon removal of the bolts 12 provides ready access to the crank case of the compressor and permits of inspection, adjustment or removal of the big end bearing 37 of the connecting-rods 36.

From the foregoing it will be noted that I have provided a multicylinder compressor associated with the front end of the crank shaft in such a way as to prevent vibration of said shaft, and in which the cylinders are so disposed as to provide a minimum overall length for the compressor.

I desire it to be understood that this invention is not to be limited to any particular form or arrangement of parts except in so far as such limitations are specified in the claim or necessitated by the prior art.

What I claim as my invention is:

In an automotive engine, the combination with the crank case and crank shaft of the engine, of a front cover plate forming a closure for the front end of the engine crank case and having a forwardly extending compressor crank case portion into which the front end of the engine crank shaft projects, said cover plate having a cylinder-supporting portion, air compressor cylinders mounted on said cylinder-supporting portion, a piston working in each cylinder, and crank members mounted on and continuously driven by said crank shaft and operatively connected to said pistons, the moving parts of said compressor being dynamically balanced whereby to relieve the extended end of said engine crank shaft of vibrational forces.

In testimony whereof, I affix my signature.

NIELS A. CHRISTENSEN.